US012576398B2

(12) United States Patent
Kang et al.

(10) Patent No.: US 12,576,398 B2
(45) Date of Patent: Mar. 17, 2026

(54) METHOD FOR PREPARING A HYDROCARBON ADSORPTION CATALYST, A HYDROCARBON ADSORPTION CATALYST PREPARED THEREBY, AND A HYDROCARBON TRAP COMPRISING THE SAME

(71) Applicants: Hyundai Motor Company, Seoul (KR); Kia Corporation, Seoul (KR); Korea University Research and Business Foundation, Seoul (KR)

(72) Inventors: Chun Yong Kang, Gyeonggi-do (KR); Eunhee Jang, Gyeonggi-do (KR); Jungkyu Choi, Seoul (KR); Jaehee Shim, Gyeonggi-do (KR); Jin Seong Kim, Seoul (KR)

(73) Assignees: Hyundai Motor Company, Seoul (KR); Kia Corporation, Seoul (KR); Korea University Research and Business Foundation, Seoul (KR)

( * ) Notice: Subject to any disclaimer, the term of this patent is extended or adjusted under 35 U.S.C. 154(b) by 246 days.

(21) Appl. No.: 18/121,922

(22) Filed: Mar. 15, 2023

(65) Prior Publication Data
US 2024/0149254 A1 May 9, 2024

(30) Foreign Application Priority Data
Nov. 8, 2022 (KR) ........................ 10-2022-0147751

(51) Int. Cl.
*B01J 29/72* (2006.01)
*B01J 6/00* (2006.01)
(Continued)

(52) U.S. Cl.
CPC ........... *B01J 29/7215* (2013.01); *B01J 6/001* (2013.01); *B01J 20/165* (2013.01);
(Continued)

(58) Field of Classification Search
CPC ...... B01J 29/7215; B01J 6/001; B01J 20/165; B01J 20/3078; B01J 20/3204;
(Continued)

(56) References Cited

U.S. PATENT DOCUMENTS

| | | | | |
|---|---|---|---|---|
| 4,780,436 A | * | 10/1988 | Raatz | ................... B01J 29/7423 |
| | | | | 502/66 |
| 2012/0087851 A1 | * | 4/2012 | Deuerlein | ............... C07C 51/42 |
| | | | | 423/239.2 |
| 2020/0360891 A1 | * | 11/2020 | Kang | ....................... B01J 20/06 |

FOREIGN PATENT DOCUMENTS

JP          2012239924 A   * 12/2012

OTHER PUBLICATIONS

JP-2012239924-A, English Translation of Description and Claims (Year: 2012).*

(Continued)

*Primary Examiner* — Coris Fung
(74) *Attorney, Agent, or Firm* — Fox Rothschild LLP

(57) ABSTRACT
Provided herein are a method for producing a hydrocarbon adsorption catalyst includes dealuminated zeolite by heat-treating a zeolite in moisture-containing air at a first temperature to remove a portion of aluminum included in the zeolite, and supporting a metal on a carrier including the zeolite after the heat-treating and a hydrocarbon adsorption catalyst prepared using the same method. The metal-supported support may be additionally heat-treated in moisture-containing air at a second temperature that is higher than the first temperature.

16 Claims, 8 Drawing Sheets

(51) Int. Cl.
B01J 20/16 (2006.01)
B01J 20/30 (2006.01)
B01J 20/32 (2006.01)
B01J 37/02 (2006.01)
B01J 37/10 (2006.01)

(52) U.S. Cl.
CPC ....... B01J 20/3078 (2013.01); B01J 20/3204 (2013.01); B01J 37/0209 (2013.01); B01J 37/0236 (2013.01); B01J 37/10 (2013.01)

(58) Field of Classification Search
CPC .......................... B01J 37/0209; B01J 37/0236; B01J 2229/16; B01J 29/7615; B01J 37/02; B01J 20/3236; B01J 29/76; B01D 2253/108; B01D 2253/25; B01D 2255/20761; B01D 2255/50; B01D 2257/702
See application file for complete search history.

(56) References Cited

OTHER PUBLICATIONS

Song, C.; et al., Synergism between the Lewis and Bronsted acid sites on HZSM-5 zeolites in the conversion of methylcyclohexane, Chinese Journal of Catalysis, 2013, 34, 2153-2159 (Year: 2013).*

* cited by examiner

METHOD FOR PREPARING A HYDROCARBON ADSORPTION CATALYST, A HYDROCARBON ADSORPTION CATALYST PREPARED THEREBY, AND A HYDROCARBON TRAP COMPRISING THE SAME

CROSS-REFERENCE TO RELATED APPLICATION

This application claims priority to and the benefit of Korean Patent Application No. 10-2022-0147751 filed in the Korean Intellectual Property Office on Nov. 8, 2022, the entire contents of which are incorporated herein by reference.

TECHNICAL FIELD

The present disclosure relates to a method for preparing a hydrocarbon adsorption catalyst having improved hydrocarbon (HC) reduction performance in a cold start section by heat-treating a support for the catalyst in moisture containing air, a hydrocarbon adsorption catalyst prepared thereby, and a hydrocarbon trap including the same.

BACKGROUND

An exhaust gas of a gasoline vehicle is purified by a three-way catalyst. For example, when a temperature of the catalyst is greater than or equal to 400° C., purification performance of nearly 100% may be obtained. However, in the cold-start section immediately after engine start, the three-way catalyst does not operate normally, so the exhaust gas is not purified and is discharged into the atmosphere. In particular, about 70% of the total EM is emitted from the cold-start section of hydrocarbon (HC).

As an approach against these problems, a zeolite-based catalyst for adsorbing hydrocarbon (HC trap) is introduced into the exhaust gas system, the catalyst for adsorbing hydrocarbon temporarily adsorbs the hydrocarbons discharged from the cold-start section until the three-way catalyst warm-up is completed, and then it is purified through a three-way catalyst when desorbed from a catalyst for adsorbing hydrocarbon at the end of the three-way catalyst warm-up.

In most of the studies reported to date, zeolite-based catalysts for adsorbing hydrocarbon have insufficient high-temperature heat resistance, and their structure collapses above 850° C. Therefore, only the method of installing and using it on the underfloor has been examined. However, in the underfloor, a warm-up rate of the three-way catalyst is slow, so it is difficult to apply the catalyst for adsorbing hydrocarbon technology because a hydrocarbon slip occurs from the catalyst for adsorbing hydrocarbon before activation of the three-way catalyst.

In addition, zeolite containing transition metals performs adsorption of unsaturated hydrocarbon and oxidation and may be used as an effective hydrocarbon trap (HC trap). However, when exposed to a high-temperature environment containing moisture ($H_2O$), there is a problem of structural collapses, and since actual exhaust gas also contains moisture, heat resistance needs to be increased in order to utilize zeolite containing transition metals in this environment.

SUMMARY

In preferred aspects, provided is a method of preparing a hydrocarbon adsorption catalyst capable of improving hydrocarbon reduction performance in a cold start section. The method is characterized that the structural collapse of zeolite supported with a metal may be prevented during hydrothermal treatment to strengthen durability and heat resistance of the catalyst and that the hydrogen storage amount may be improved to increase hydrocarbon adsorption performance of the catalyst.

In one aspect, provided is a method for preparing a hydrocarbon adsorption catalyst including: first heat-treating a zeolite in moisture-containing air at a first temperature to remove a portion of aluminum included in the zeolite, and supporting a metal on a carrier including the zeolite.

The zeolite, after the first heat-treating, may have a Si/Al molar ratio of about 10 to about 200.

The zeolite, after the first heat-treating, may have an amount of a Lewis acid site of about 300 $\mu mol \cdot g^{-1}$ to about 700 $\mu mol \cdot g^{-1}$.

The zeolite may include BEA type zeolite, MFI type zeolite (ZSM-5), FAU type zeolite (Y), A type zeolite, X type zeolite, CHA type zeolite, or a combination thereof.

The first temperature may be about 200° C. to about 500° C.

The first heat-treating may be performed under an atmosphere in which air including about 5 volume % to about 15 volume % of moisture is supplied at a rate of about 100 mL/min to about 2000 mL/min at the first temperature.

A temperature increase rate of the first heat-treating, at the first temperature may be about 10° C./min to about 20° C./min, and a space velocity (Feed/$W_{zeolite}$) may be about 10,000 $mL \cdot h^{-1} \cdot g^{-1}$ to about 200,000 $mL \cdot h^{-1} \cdot g^{-1}$.

The first heat-treating at the first temperature may be performed for about 6 hours to about 36 hours.

The metal may include Cu, Fe, Co, Ti, Zn, Ag, Mn, Ni, Ce, or a combination thereof.

After the first heat-treating, the supporting the metal on the carrier may be performed by impregnating the zeolite in a solution including a metal precursor, drying, and calcination.

The drying may be performed at a temperature of about 70° C. to about 150° C. for about 1 hour to about 24 hours.

The calcination may be performed at a temperature of about 400° C. to about 700° C. for about 1 hour to about 24 hours.

The calcination may be performed under an atmosphere in which air is supplied at about 100 cc/min to about 500 cc/min.

The catalyst may include the metal in an amount of about 1 wt % to about 20 wt % based on the total weight of the catalyst.

The carrier on which the metal is supported may be subjected to second heat-treating in moisture-containing air at a second temperature that is higher than the first temperature.

The second temperature may be about 600° C. to about 900° C.

The second heat-treating at the second temperature may be performed under an atmosphere in which air including about 5 volume % to about 15 volume % of moisture is supplied at a rate of about 100 mL/min to about 2000 mL/min.

A temperature increase rate of the second heat-treating at the second temperature may be about 20° C./min to about 30° C./min, and a space velocity (Feed/$W_{zeolite}$) may be about 10,000 $mL \cdot h^{-1} \cdot g^{-1}$ to about 200,000 $mL \cdot h^{-1} \cdot g^{-1}$.

The heat-treating at the second temperature may be performed for about 6 hours to about 36 hours.

In another aspect, provided is a hydrocarbon adsorption catalyst prepared by the method described herein. The hydrocarbon adsorption catalyst may include a carrier including a zeolite from which a portion of aluminum included in the zeolite is removed, and a metal supported on the carrier.

In another aspect, provided is a hydrocarbon trap including a substrate and a catalyst layer coated on the substrate. The catalyst layer includes the hydrocarbon adsorption catalyst as described herein.

Also provided is a vehicle including the hydrocarbon trap as described herein.

According to various exemplary embodiments in the present disclosure, the method for preparing a hydrocarbon adsorption catalyst may improve the hydrocarbon reduction performance in a cold start section by preventing the structural collapse of zeolite on which a metal is supported during the hydrothermal treatment to strengthen durability and heat resistance of the catalyst and improving hydrocarbon adsorption performance of the catalyst to increase a hydrocarbon storage amount.

Other aspects of the invention are disclosed infra.

DETAILED DESCRIPTION

Figure 1:
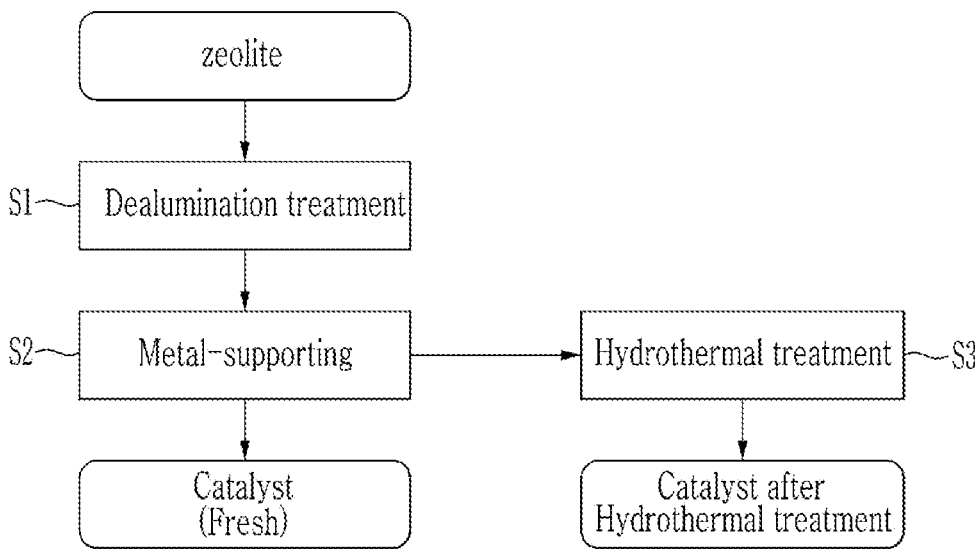
FIG. 1 shows an exemplary method for preparing a hydrocarbon adsorption catalyst according to an exemplary embodiment of the present disclosure.

The advantages and features of the present disclosure and the methods for accomplishing the same will be apparent from the embodiments described hereinafter with reference to the accompanying drawings. However, an implemented form may not be limited to exemplary embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

Throughout the drawings, like elements are denoted by like reference numerals. In the accompanying drawings, the dimensions of the structures are larger than actual sizes for clarity of the present invention. Terms used in the specification, "first", "second", etc., may be used to describe various components, but the components are not to be construed as being limited to the terms. These terms are used only for the purpose of distinguishing a component from another component. For example, a first component may be referred as a second component, and the second component may be also referred to as the first component. As used herein, the singular forms "a", "an", and "the" are intended to include the plural forms as well unless the context clearly indicates otherwise.

It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In this specification, where a range of a variable is described, it will be understood that the variable includes all values within the stated range, including the stated endpoints of the range. For example, a range of 5 to 10 includes: integer values such as 5, 6, 7, 8, 9, and 10; any subranges such as 6 to 10, 7 to 10, 6 to 9, 7 to 9, and the like; and any values between integers such as 5.5, 6.5, 7.5, 5.5 to 8.5 and 6.5 to 9, and the like. For example, a range of 10% to 30% includes: any integer percentages such as 10%, 11%, 12%, 13%, and the like, inclusive of 30%; any sub ranges such as 10% to 15%, 12% to 18%, 20% to 30%, and the like; and any non-integer percentages between integer percentages such as 10.5%, 15.5%, 25.5%, and the like.

In an aspect, a method for preparing a hydrocarbon adsorption catalyst includes a dealumination treatment step (S1) and a metal supporting step (S2).

FIG. 1 shows an exemplary method for preparing a hydrocarbon adsorption catalyst according to an exemplary embodiment of the present disclosure.

In the dealumination treatment step (S1), the zeolite is hydrothermally treated, i.e., heat-treated in moisture-containing air, at a first temperature to remove a portion aluminum included in the zeolite. The dealumination treatment step (S1) may be a first heat-treating of zeolite.

When zeolite is dealuminated, a portion of aluminum in the zeolite structure is removed. Accordingly, since chemical properties of zeolite, for example, an amount of Lewis acid sites and the like are changed, the zeolite on which a metal is supported is prevented from structural collapse during the first heat-treating in the present of moisture, or first hydrothermal treatment.

Accordingly, the method for preparing a hydrocarbon adsorption catalyst prevents structural collapse of metal-supported zeolite during the hydrothermal treatment to enhance durability and heat resistance of the catalyst, improving hydrocarbon adsorption performance of the catalyst, and increasing hydrocarbon storage of the catalyst and thus improving hydrocarbon reduction performance.

The dealuminated zeolite may have a Si/Al molar ratio of about 10 to about 200, or particularly about 10 to about 70. When the dealuminated zeolite has a Si/Al molar ratio of less than about 10, zeolite may structurally collapse, and when greater than about 200, a hydrocarbon adsorption amount may be smaller.

The dealuminated zeolite may have an amount of Lewis acid sites of about 300 $\mu$mol·g$^{-1}$ to about 700 $\mu$mol·g$^{-1}$, for example, about 400 $\mu$mol·g$^{-1}$ to about 600 $\mu$mol·g$^{-1}$. When the dealuminated zeolite has an amount of Lewis acid sites of less than about 300 $\mu$mol·g$^{-1}$, hydrocarbon adsorption performance may be deteriorated.

For example, zeolite may include BEA type zeolite, MFI type zeolite (ZSM-5), FAU type zeolite (Y), A type zeolite, X type zeolite, CHA type zeolite, or a combination thereof, for example when H-BEA is included, adsorption efficiency of long-chain hydrocarbon may be increased.

The first temperature may be about 200° C. to about 500° C., for example about 350° C. to about 500° C. When the first temperature is less than about 200° C., water vapor is condensed during the first hydrothermal treatment, which make it difficult to perform the dealumination treatment (the first heat-treating), and when the first temperature is greater than about 500° C., severe dealumination occurs, structurally collapsing the zeolite.

The first hydrothermal treatment may be performed at the first temperature under an atmosphere in which air containing about 5 volume % to about 15 volume % of moisture is supplied at about 100 mL/min to about 2000 mL/min.

During the first hydrothermal treatment, when the air has a moisture content of less than about 5 volume %, the dealumination may not effectively occur, and when greater than about 15 volume %, the structure of zeolite may be excessively collapsed, resulting in significant performance deterioration.

During the first hydrothermal treatment, when the air is supplied at less than about 100 mL/min, the dealumination may not effectively occur, and when the air is supplied at greater than about 2000 mL/min, the dealumination may excessively occur, structurally collapsing zeolite.

The first hydrothermal treatment may be performed at a temperature increase rate of about 10° C./min to about 20° C./min.

The first hydrothermal treatment may be performed at a space velocity (Feed/W$_{zeolite}$) of about 10,000 mL·h$^{-1}$·g$^{-1}$ to about 200,000 mL·h$^{-1}$·g$^{-1}$. When the first hydrothermal treatment is performed at a space velocity of less than about 10,000 mL·h$^{-1}$·g$^{-1}$, the dealumination may not effectively occur, and when the first hydrothermal treatment is performed at a space velocity of greater than about 200,000 mL·h$^{-1}$·g$^{-1}$, the dealumination may excessively occur, structurally collapsing zeolite.

The first hydrothermal treatment may be performed for about 6 hours to about 36 hours. When the first hydrothermal treatment is performed for less than about 6 hours, the dealumination may not effectively occur, and when performed for greater than about 36 hours, the structure of zeolite may be excessively collapsed, deteriorating performance.

In the metal-supporting step (S2), a metal may be supported on a carrier including the dealuminated zeolite, preparing a catalyst.

For example, the metal-supporting may use wet impregnation which is performed by impregnating the dealuminated zeolite in a solution including a metal precursor, and then drying and calcination it.

The metal may include Cu, Fe, Co, Ti, Zn, Ag, Mn, Ni, Ce, or a combination thereof. The precursor of the metal may be a nitrate, hydrochloride, acetate salt, sulfate, or hydroxide of the metal. For example, when the metal is Cu, the precursor may be copper (II) nitrate (Cu(NO$_3$)$_2$), copper acetate (Cu acetate), or a hydroxide thereof.

The solution including the precursor of the metal may be prepared by adding the precursor of the metal to a solvent. For example, the solvent may include distilled water, deionized water, ethanol, methanol, ethylene glycol, propylene glycol, isopropyl alcohol, or a combination thereof.

For example, the drying may be performed at about 70° C. to about 150° C. for about 1 hour to about 24 hours after removing moisture by putting the solution including the dealuminated zeolite and the precursor of the metal in a rotary evaporator.

The calcination may be performed at about 400° C. to about 700° C. for about 1 hour to about 24 hours. The calcination may be performed under an atmosphere of supplying air at about 100 cc/min to about 500 cc/min. The calcination may be performed at a temperature increase rate of about 0.5° C./min to about 5° C./min.

The metal may be included in an amount of about 1 wt % to about 20 wt % based on the total weight of the catalyst. When the metal content is less than about 1 wt %, adsorption performance of a short-chain unsaturated hydrocarbon may be deteriorated, and when the metal content is greater than about 20 wt %, a metal oxide may be excessively produced, deteriorating hydrothermal stability.

Optionally, the prepared catalyst may be subjected to a second hydrothermal treatment (heat treating in moisture-containing air) at a higher second temperature than the first temperature (S3). The catalyst is subjected to the second hydrothermal treatment at a higher second temperature than the first temperature to prepare a hydrothermally treated hydrocarbon adsorption catalyst and thus strengthen durability and heat resistance of the catalyst. For example, when the prepared catalyst is subjected to the second hydrothermal treatment, durability of the catalyst may be tested under harsh conditions similar to when a car is operated for a long time.

The second temperature may be about 600° C. to about 900° C., for example, about 700° C. to about 800° C. When the second temperature is less than about 600° C., this temperature may not be said to be the harsh conditions similar to when a car is operated for a long time, and when the second temperature is greater than about 900° C., the zeolite structure may be completely collapsed.

The second hydrothermal treatment may be performed under an atmosphere of supplying air including about 5 volume % to about 15 volume % of moisture at about 100 mL/min to about 2000 mL/min at the second temperature.

When the air has a moisture content of less than about 5 volume % during the second hydrothermal treatment, the second hydrothermal treatment may not properly occur at a high temperature, and when the air has a moisture content of greater than about 15 volume %, the hydrothermal treatment may excessively occur at the high temperature, which may completely collapse the zeolite structure.

When the second hydrothermal treatment is performed by supplying air at less than about 100 mL/min, the second hydrothermal treatment may not properly occur at the high temperature, and the second hydrothermal treatment is performed by supplying air at greater than about 2000 mL/min, the second hydrothermal treatment may excessively occur, which may completely collapse the zeolite structure.

The temperature increase rate of the second hydrothermal treatment may be about 20° C./min to about 30° C./min.

The second hydrothermal treatment may be performed at a space velocity (Feed/$W_{zeolite}$) of about 10,000 mL·h$^{-1}$·g$^{-1}$ to about 200,000 mL·h$^{-1}$·g$^{-1}$. When the second hydrothermal treatment is performed at a space velocity of less than about 10,000 mL·h$^{-1}$·g$^{-1}$, the second hydrothermal treatment may not properly occur at a high temperature, and when the second hydrothermal treatment is performed at a space velocity of greater than about 200,000 mL·h$^{-1}$·g$^{-1}$, the second hydrothermal treatment may excessively occur, which may completely collapse the zeolite structure.

The second hydrothermal treatment may be performed for about 6 hours to about 36 hours. The second hydrothermal treatment performed for less than about 6 hours may not be said to be harsh conditions similar to when a car is operated for a long time, and the second hydrothermal treatment performed for greater than about 36 hours may completely collapse the zeolite structure.

A hydrocarbon adsorption catalyst may be prepared by the method described herein.

The hydrocarbon adsorption catalyst may include a carrier including the dealuminated zeolite and a metal supported on the carrier.

Since the descriptions of the dealuminated zeolite and the metal are the same as described above, a repeated description will be omitted.

A hydrocarbon trap may include a substrate and a catalyst layer coated on the substrate, and the catalyst layer includes the hydrocarbon adsorption catalyst as described herein.

The substrate may be any substrate used in a catalyst for purifying automobile exhaust, for example, a substrate with a metal or ceramic honeycomb structure, and a monolithic penetrating substrate having a plurality of fine and parallel gas flow passages connected from the inlet to the outlet and open to a fluid flow.

On the walls of the passages of the substrate, a catalyst material is wash-coated, so that gas flowing through the passages may contact the catalyst material. The passages of the monolithic substrate may be thin-walled channels having any appropriate cross-section shape, for example, a trapezoid, a rectangle, a square, a sign waveform, a hexagon, an oval, a circle, and the like. Such structures may contain greater than or equal to about 60 to about 1200 gas inlet openings (i.e., cells) per 1 inch$^2$ (cpsi) of the cross-section. A representative commercially-available substrate is Corning 400/6, which is formed of a cordierite material and has cell density of about 400 cpsi and a wall thickness of about 6 mm.

The ceramic substrate may be any suitable refractory material, such as cordierite, cordierite-α alumina, silicon nitride, zircon mullite, spodumene, alumina-silica magnesia, zircon silicate, silmanite, magnesium silicate, zircon, petalite, α alumina, aluminosilicate, and the like.

The metal substrate may include a heat resistant metal such as titanium and stainless steel and its metal alloy, and also other alloys including iron as a substantial or main component. The alloys may include at least one of nickel, chromium, and/or aluminum, and these metals may be included in an amount of greater than or equal to about 15 wt % based on the total weight of an alloy. For example, about 10 wt % to about 25 wt % of chromium, about 3 wt % to about 8 wt % of aluminum and at most about 20 wt % of nickel may be included. The alloys may include at least one other metal, for example, manganese, copper, vanadium, titanium, and the like in a small amount or a trace amount. The metal substrate may have various shapes such as a corrugated or monolithic shape and the like. The representative commercially-available metal substrate may be made by Emitec Inc.

EXAMPLE

Hereinafter, specific examples of the invention are described. However, the examples described below are for illustrative purposes only, and the scope of the invention is not limited thereto.

Preparation Example: Preparation of Hydrocarbon Adsorption Catalyst

Example 1

0.6 g of H-BEA (Si/Al=12.5) was dealuminated by a first hydrothermal treatment at 350° C. for 24 hours, while air containing 10 volume % of moisture at 1000 mL/min was flown. Herein, the heating time was 30 min, and Feed/$W_{zeolite}$ was 100,000 mL·h$^{-1}$·g$^{-1}$.

1 g of the dealuminated H-BEA was added to 16.6 mL of a 0.029 M copper precursor solution (copper precursor: $Cu(NO_3)_2 \cdot 3H_2O$, Product No. 61197, Sigma-Aldrich Co., Ltd.) and then, put in a rotary evaporator to remove all moisture, and Cu-impregnated dealuminated H-BEA was recovered therefrom and dried at 100° C. for 3 hours. Subsequently, the dried product was calcined, while flowing air at 550° C. for 6 hours at 500 cc/min, preparing a catalyst. Herein, the temperature increase rate (ramp rate) was 1° C./min, and the impregnated Cu was 3 wt %.

Subsequently, an additional hydrothermal treatment was performed in order to compare hydrothermal stability. This hydrothermal treatment of 0.6 g of the Cu-supported dealuminated H-BEA (fresh) was performed by flowing 10 volume % of moisture-containing air at 1000 mL/min at 800° C. for 24 hours, preparing a catalyst. Herein, the temperature increase rate was 25.7° C./min, and Feed/$W_{zeolite}$ was 100, 000 mL·h$^{-1}$·g$^{-1}$.

Example 2

A catalyst was prepared in the same manner as in Example 1, except that the dealumination temperature was changed to 400° C.

Example 3

A catalyst was prepared in the same manner as in Example 1, except that the dealumination temperature was changed to 450° C.

Example 4

A catalyst was prepared in the same manner as in Example 1, except that the dealumination temperature was changed to 500° C.

Comparative Example 1

A catalyst was prepared in the same manner as in Example 1, except that H-BEA was not dealuminated.

Experimental Example 1: NMR and FT-IR Measurement of Catalyst

In Examples 1 to 4 and Comparative Example 1, a bare sample before supporting copper (Cu) was measured with respect to Al NMR, which was used to calculate an area ratio of tetrahedral Al with reference to the sample of Comparative Example 1, and the results are shown in Table 1.

TABLE 1

|  | Tetrahedral Al Area (%) |
| --- | --- |
| Comparative Example 1 | 100 |
| Example 1 | 98.2 |
| Example 2 | 95.4 |
| Example 3 | 96.0 |
| Example 4 | 91.2 |

When a bare sample not supported with a metal w measured with respect to Al NMR, as the dealumination treatment temperature is increased, and a peak at 53 ppm associated with tetrahedral Al sites decreases.

Accordingly, as shown in Table 1, when then dealumination treatment (S1) was performed, the samples of Examples 1 to 4 exhibited a decreased in tetrahedral Al area ratio compared with the sample of Comparative Example 1.

In addition, in Examples 1 to 4 and Comparative Example 1, the catalysts before and after the hydrothermal treatment were measured with respect to Si NMR, Si NMR results were deconvoluted to calculate Si/Al, and the results are shown in Table 2.

TABLE 2

|  | Before/after hydrothermal treatment | Si/Al (EDX) | Si/Al (NMR) |
| --- | --- | --- | --- |
| Comparative Example 1 | before hydrothermal treatment | 11.7 ± 0.3 | 22.5 |
| Example 1 | before hydrothermal treatment | 11.5 ± 0.1 | 30.4 |
| Example 2 | before hydrothermal treatment | 11.6 ± 0.1 | 32.2 |
| Example 3 | before hydrothermal treatment | 11.8 ± 0.2 | 31.6 |
| Example 4 | before hydrothermal treatment | 11.6 ± 0.2 | 32.6 |
| Comparative Example 1 | after hydrothermal treatment | 11.5 ± 0.2 | N/A |
| Example 1 | after hydrothermal treatment | 11.9 ± 0.3 | N/A |
| Example 2 | after hydrothermal treatment | 11.6 ± 0.3 | N/A |
| Example 3 | after hydrothermal treatment | 11.8 ± 0.2 | N/A |
| Example 4 | after hydrothermal treatment | 11.6 ± 0.4 | N/A |

As shown in Table 2, the catalysts of Examples 1 to 4 and Comparative Example 1 exhibited significant structural collapse after the hydrothermal treatment, which made the deconvolution impossible.

As shown in Table 2, compared with the catalyst of Comparative Example 1, the catalysts of Examples 1 to 4 exhibited increased Si/Al.

Referring to the NMR results, the catalysts of Examples 1 to 4 were dealuminated by the hydrothermal treatment.

In addition, in Examples 1 to 4 and Comparative Example 1, each of a bare sample before supporting copper (Cu), a catalyst carrying copper (Cu), and a catalyst after the hydrothermal treatment were measured with respect to Py FT-IR, and the results are shown in Table 3.

TABLE 3

|  | Before/ after Cu supporting | Before/ after hydrothermal treatment | B site (μmol · g$^{-1}$) | L site (μmol · g$^{-1}$) | Change amount of B acid site after Cu supporting | Change amount of L acid site after Cu supporting | Change amount of B acid site after 800 HT | 8 Change amount of L acid site after 800 HT |
| --- | --- | --- | --- | --- | --- | --- | --- | --- |
| Comp. Ex. 1 | before Cu supporting | before hydrothermal treatment | 600 | 60 | — | — | — | — |
| Ex. 1 | before Cu supporting | before hydrothermal treatment | 560 | 60 | — | — | — | — |
| Ex. 2 | before Cu supporting | before hydrothermal treatment | 510 | 60 | — | — | — | — |
| Ex. 3 | before Cu supporting | before hydrothermal treatment | 460 | 50 | — | — | — | — |

TABLE 3-continued

| | Before/after Cu supporting | Before/after hydrothermal treatment | B site (μmol·g⁻¹) | L site (μmol·g⁻¹) | Change amount of B acid site after Cu supporting | Change amount of L acid site after Cu supporting | Change amount of B acid site after 800 HT | 8 Change amount of L acid site after 800 HT |
|---|---|---|---|---|---|---|---|---|
| Ex. 4 | before Cu supporting | before hydrothermal treatment | 440 | 50 | — | — | — | — |
| Comp. Ex. 1 | after Cu supporting | before hydrothermal treatment | 120 | 480 | 480 | 420 | — | — |
| Ex. 1 | after Cu supporting | before hydrothermal treatment | 120 | 510 | 440 | 450 | — | — |
| Ex. 2 | after Cu supporting | before hydrothermal treatment | 150 | 580 | 360 | 520 | — | — |
| Ex. 3 | after Cu supporting | before hydrothermal treatment | 150 | 540 | 310 | 490 | — | — |
| Ex. 4 | after Cu supporting | before hydrothermal treatment | 100 | 430 | 340 | 380 | — | — |
| Comp. Ex. 1 | after Cu supporting | after hydrothermal treatment | 30 | 160 | — | — | 90 | 320 |
| Ex. 1 | after Cu supporting | after hydrothermal treatment | 20 | 80 | — | — | 100 | 430 |
| Ex. 2 | after Cu supporting | after hydrothermal treatment | 30 | 180 | — | — | 120 | 400 |
| Ex. 3 | after Cu supporting | after hydrothermal treatment | 20 | 150 | — | — | 130 | 390 |
| Ex. 4 | after Cu supporting | after hydrothermal treatment | 10 | 90 | — | — | 90 | 340 |

As shown in Table 3, the sample before supporting Cu exhibited that Brønsted acid sites (B sites) were reduced as the dealumination treatment was performed, and more reduced as the dealumination temperature was increased.

Experimental Example 2: Evaluation of Adsorption/Desorption Performance of Catalyst The catalysts of Examples 1 to 4 and Comparative Example 1 were evaluated with respect to hydrocarbon adsorption/desorption.

The hydrocarbon adsorption/desorption evaluation of the catalyst was evaluated by filling 60 mg of the catalyst in a reaction tube, performing pretreatment under a He flow at a temperature of about 600° C. for about 30 minutes, supplying a mixed gas including $C_3H_6$ (162 ppm), $C_7H_8$ (162 ppm), CO (0.58 volume %), $H_2$ (0.19 volume %), $O_2$ (0.60 volume %), $CO_2$ (13.36 volume %), $H_2O$ (10 volume %), and an Ar/He-conveying gas (balance volume %) at a temperature of about 70° C. for about 5 minutes for at about 100 cc/min to perform adsorption, increasing a temperature to 600° C. at a rate of 53° C./min, and evaluating desorption and oxidation patterns.

Figure 2:
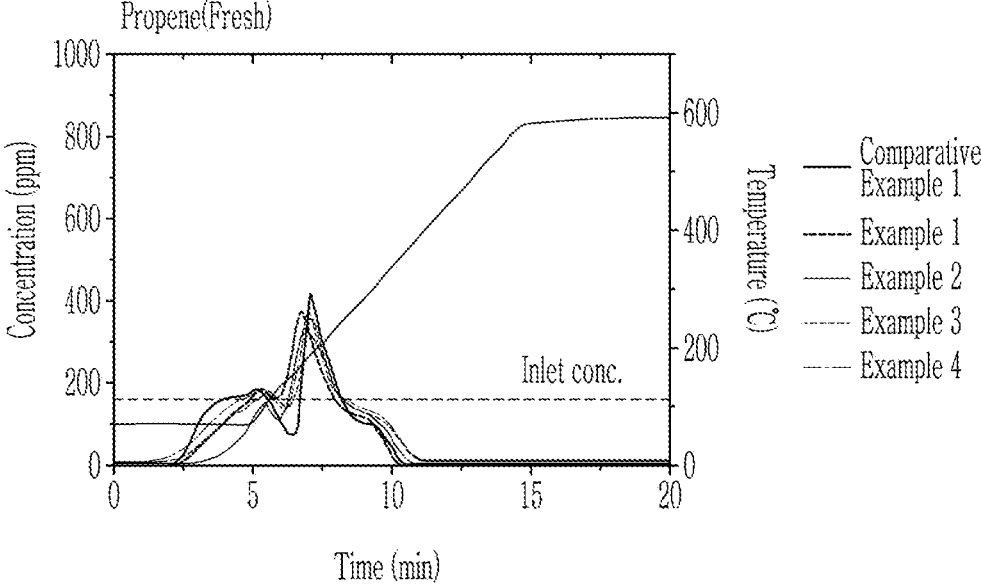
FIG. 2 is a graph showing propene adsorption/desorption evaluation results before hydrothermal treatment of the catalysts prepared in Examples 1 to 4 and Comparative Example 1.
Figure 3:
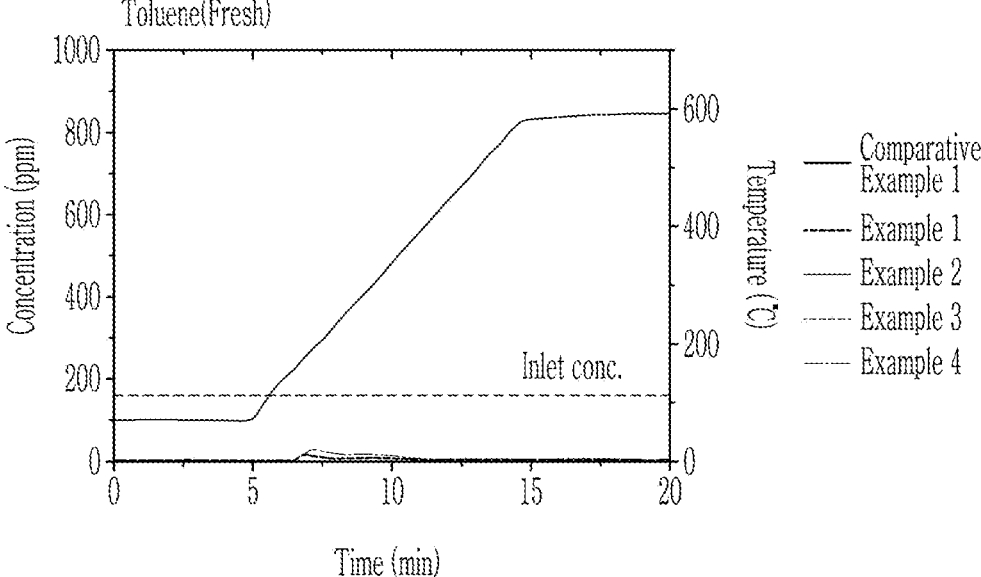
FIG. 3 is a graph showing toluene adsorption/desorption evaluation results before hydrothermal treatment of the catalysts prepared in Examples 1 to 4 and Comparative Example 1.
Figure 4:
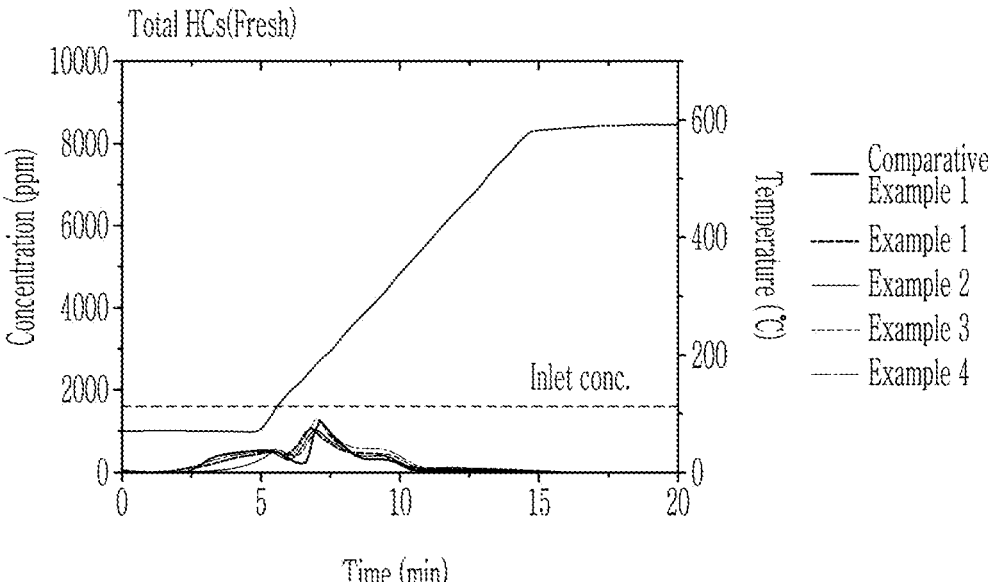
FIG. 4 is a graph showing the results of evaluation of total HCs adsorption/desorption before hydrothermal treatment of the catalysts prepared in Examples 1 to 4 and Comparative Example 1.

FIG. 2 is a graph showing propene adsorption/desorption evaluation results before hydrothermal treatment of the catalysts prepared in Examples 1 to 4 and Comparative Example 1, FIG. 3 is a graph showing toluene adsorption/desorption evaluation results before hydrothermal treatment of the catalysts prepared in Examples 1 to 4 and Comparative Example 1, and FIG. 4 is a graph showing the results of evaluation of total HCs adsorption/desorption before hydrothermal treatment of the catalysts prepared in Examples 1 to 4 and Comparative Example 1.

Figure 5:
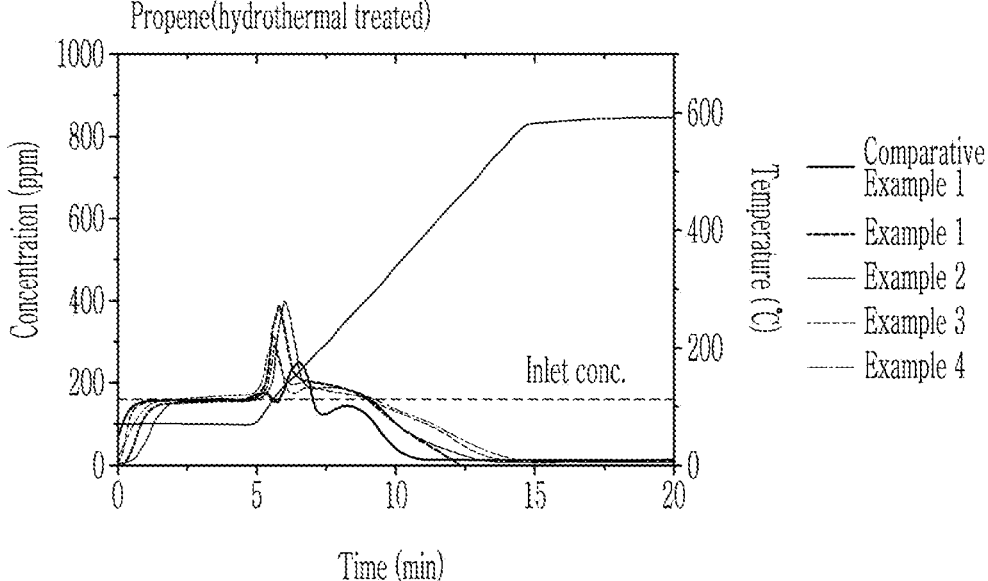
FIG. 5 is a graph showing propene adsorption/desorption evaluation results after hydrothermal treatment of the catalysts prepared in Examples 1 to 4 and Comparative Example 1.
Figure 6:
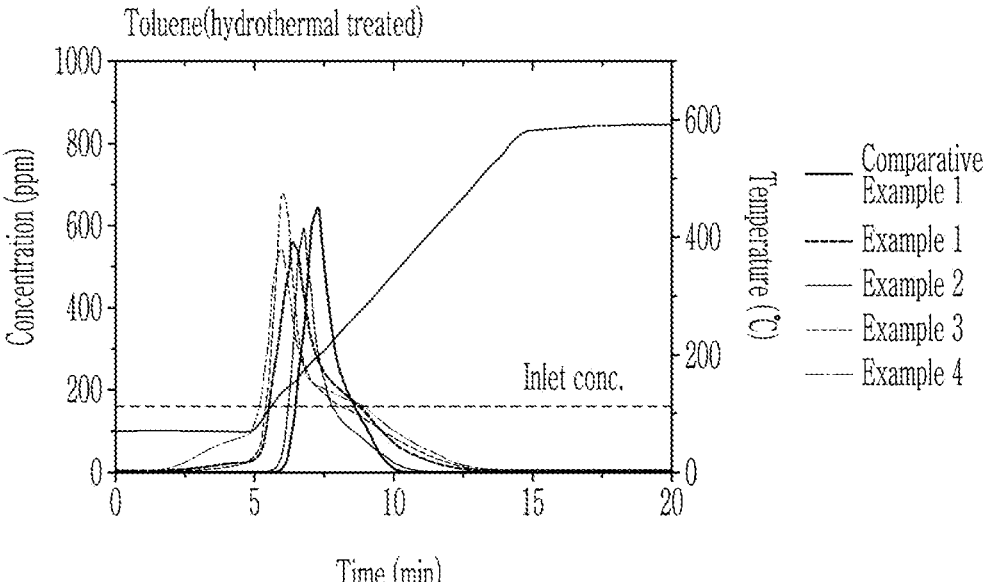
FIG. 6 is a graph showing evaluation results of toluene adsorption/desorption after hydrothermal treatment of the catalysts prepared in Examples 1 to 4 and Comparative Example 1.
Figure 7:
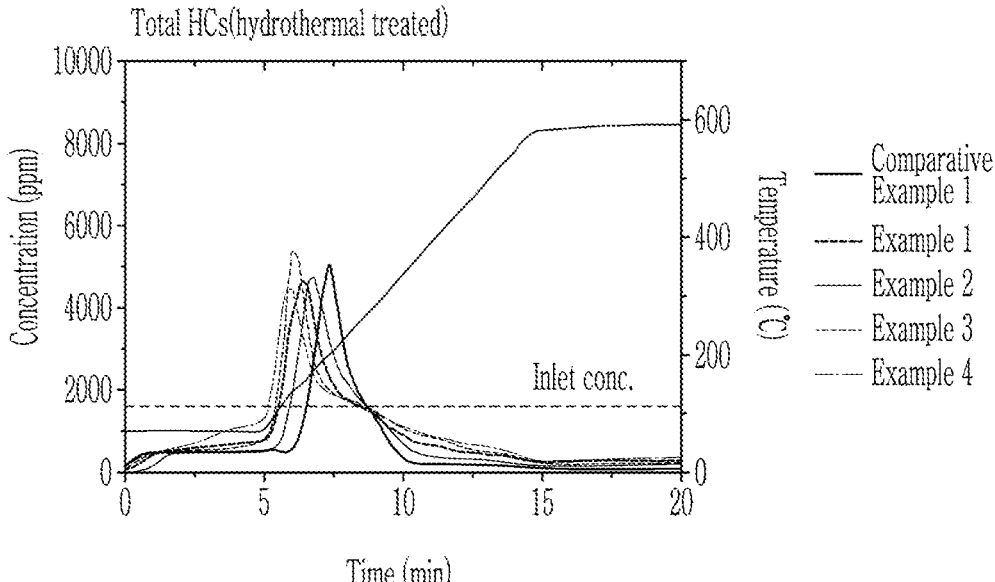
FIG. 7 is a graph showing total hydrocarbon adsorption/desorption evaluation results after hydrothermal treatment of the catalysts prepared in Examples 1 to 4 and Comparative Example 1.

FIG. 5 is a graph showing propene adsorption/desorption evaluation results after hydrothermal treatment of the catalysts prepared in Examples 1 to 4 and Comparative Example 1, FIG. 6 is a graph showing evaluation results of toluene adsorption/desorption after hydrothermal treatment of the catalysts prepared in Examples 1 to 4 and Comparative Example 1, and FIG. 7 is a graph showing total hydrocarbon adsorption/desorption evaluation results after hydrothermal treatment of the catalysts prepared in Examples 1 to 4 and Comparative Example 1.

Figure 8:
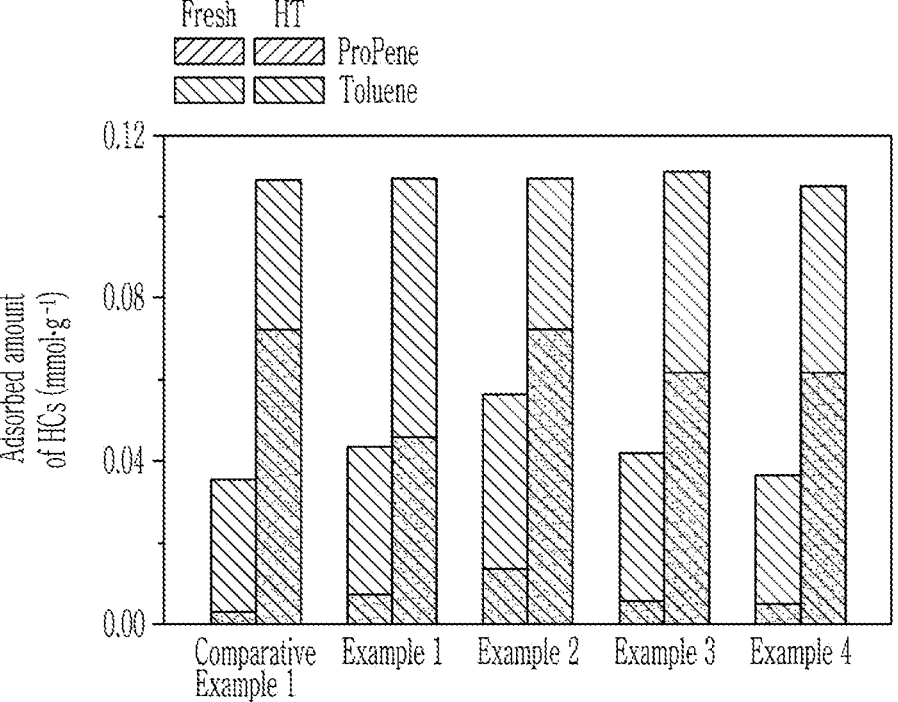
FIG. 8 is a graph showing adsorption/desorption evaluation results of catalysts prepared in Examples 1 to 4 and Comparative Example 1 before/after hydrothermal treatment.

FIG. 8 is a graph showing adsorption/desorption evaluation results of catalysts prepared in Examples 1 to 4 and Comparative Example 1 before/after hydrothermal treatment.

In FIGS. 2 to 8, HT (hydrothermal treated) represents the results of the hydrothermal treatment at a second temperature, and Fresh represents the results of fresh catalysts without the hydrothermal treatment. Total HCs represents the results of total hydrocarbon propene and toluene.

As shown in FIGS. 2 to 8, compared with Comparative Example 1, Examples 1 to 4 all exhibited a propene adsorption amount increase before/after the hydrothermal treatment, and particularly, Example 2 exhibited a clear performance increase when dealuminated at a temperature of 400° C.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope greater than or equal to appended claims.

What is claimed is:

1. A method for preparing a hydrocarbon adsorption catalyst, comprising:
   first heat-treating a zeolite in moisture-containing air at a first temperature to remove a portion of aluminum included in the zeolite; and
   supporting a metal on a carrier including the zeolite,
   wherein the carrier on which the metal is supported is subjected to second heat-treating at a second temperature that is higher than the first temperature, and
   wherein the zeolite, after the first heat-treating, has an amount of Lewis acid sites of about 400 $\mu mol \cdot g^{-1}$ to about 600 $\mu mol \cdot g^{-1}$.

2. The method of claim 1, wherein
   the zeolite after the first heat-treating has a Si/Al molar ratio of about 10 to about 200.

3. The method of claim 1, wherein
   the zeolite includes BEA type zeolite, MFI type zeolite (ZSM-5), FAU type zeolite (Y), A type zeolite, X type zeolite, CHA type zeolite, or a combination thereof.

4. The method of claim 1, wherein the first temperature is about 200° C. to about 500° C.

5. The method of claim 4, wherein the first heat-treating is performed under an atmosphere in which air including about 5 volume % to about 15 volume % of moisture is supplied at a rate of about 100 mL/min to about 2000 mL/min at the first temperature.

6. The method of claim 4, wherein a temperature increase rate of the first heat-treating at the first temperature is about 10° C./min to about 20° C./min, and a space velocity (Feed/$W_{zeolite}$) is about 10,000 $mL \cdot h^{-1} \cdot g^{-1}$ to about 200,000 $mL \cdot h^{-1} \cdot g^{-1}$.

7. The method of claim 1, wherein the first heat-treating is performed for about 6 hours to about 36 hours.

8. The method of claim 1, wherein the metal comprises Cu, Fe, Co, Ti, Zn, Ag, Mn, Ni, Ce, or a combination thereof.

9. The method of claim 1, wherein, after the first heat-treating, the supporting of the metal is performed by impregnating the zeolite in a solution comprising a metal precursor, drying, and calcination.

10. The method of claim 9, wherein the drying is performed at a temperature of about 70° C. to about 150° C. for about 1 hour to about 24 hours.

11. The method of claim 9, wherein the calcination is performed at a temperature of about 400° C. to about 700° C. for about 1 hour to about 24 hours.

12. The method of claim 9, wherein the calcination is performed under an atmosphere in which air is supplied at about 100 cc/min to about 500 cc/min.

13. The method of claim 1, wherein the catalyst comprises the metal in an amount of about 1 wt % to about 20 wt % based on the total weight of the catalyst.

14. The method of claim 1, wherein the second temperature is about 600° C. to about 900° C.

15. The method of claim 14, wherein the second heat-treating at the second temperature is performed under an atmosphere in which air including about 5 volume % to about 15 volume % of moisture is supplied at a rate of about 100 mL/min to about 2000 mL/min.

16. The method of claim 14, wherein a temperature increase rate of the second heat-treating at the second temperature is about 20° C./min to about 30° C./min, and a space velocity (Feed/$W_{zeolite}$) is about 10,000 $mL \cdot h^{-1} \cdot g^{-1}$ to about 200,000 $mL \cdot h^{-1} \cdot g^{-1}$.

* * * * *